US011269637B2

(12) United States Patent
York

(10) Patent No.: US 11,269,637 B2
(45) Date of Patent: Mar. 8, 2022

(54) VALIDATING MACHINE-READABLE INSTRUCTIONS USING AN ITERATIVE VALIDATION PROCESS

(71) Applicant: HEWLETT PACKARD ENTERPRISE DEVELOPMENT LP, Houston, TX (US)

(72) Inventor: Justin York, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/937,048

(22) Filed: Jul. 23, 2020

(65) Prior Publication Data

US 2022/0027157 A1 Jan. 27, 2022

(51) Int. Cl.
| | |
|---|---|
| *G06F 9/30* | (2018.01) |
| *G06F 9/38* | (2018.01) |
| *H04L 9/06* | (2006.01) |
| *G06F 9/50* | (2006.01) |

(52) U.S. Cl.
CPC ........ *G06F 9/30145* (2013.01); *G06F 9/3877* (2013.01); *G06F 9/5011* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 8,285,999 | B1 * | 10/2012 | Ghose | G06F 21/565 713/176 |
| 8,775,784 | B2 | 7/2014 | Diluoffo et al. | |
| 9,177,153 | B1 * | 11/2015 | Perrig | G06F 21/57 |

(Continued)

FOREIGN PATENT DOCUMENTS

CN 109144584 A 1/2019

OTHER PUBLICATIONS

Elias, Andrew, Security IP R&D, (https://www.synopsys.com) Understanding Hardware Roots of Trust downloaded Jun. 21, 2020 (9 pages).
Intel, Solution Brief—Security, Intel Security Essentials, Security Designed-in From the Start to Deliver Best Practice Hardware Protections, Nov. 2017 (4 pages).

(Continued)

*Primary Examiner* — Eric Coleman
(74) *Attorney, Agent, or Firm* — Trop, Pruner & Hu, P.C.

(57) ABSTRACT

In some examples, a system includes a first processor, a second processor, and a storage medium to store first information comprising machine-readable instructions executable by the second processor. The first processor is to validate the machine-readable instructions using an iterative validation process involving a plurality of iterations at different times, where each respective iteration of the plurality of iterations includes issuing a respective indication to the second processor to compute a value based on a respective subset of the first information, wherein the respective indication includes respective subset information identifying the respective subset, wherein the respective subset information differs from different subset information included in another indication issued in another iteration of the plurality of iterations, the different subset information identifies a different subset of the first information. Each iteration further includes determining a validity of the machine-readable instructions based on the value returned to the first processor by the second processor.

20 Claims, 5 Drawing Sheets

(56) References Cited

U.S. PATENT DOCUMENTS

| | | |
|---|---|---|
| 10,318,736 B2 | 6/2019 | Scherer, III et al. |
| 10,346,343 B2 | 7/2019 | Suresh et al. |
| 10,447,483 B1 * | 10/2019 | Su .................. H04L 9/0643 |
| 10,565,380 B2 | 2/2020 | Polak et al. |
| 2012/0198514 A1 * | 8/2012 | McCune .............. G06F 21/57 726/1 |
| 2015/0333915 A1 * | 11/2015 | Chan .............. H04L 9/3268 713/175 |
| 2016/0364570 A1 * | 12/2016 | Stern .................. G06F 21/575 |
| 2017/0093586 A1 * | 3/2017 | Miranda .............. H04W 12/04 |
| 2018/0241568 A1 * | 8/2018 | Schilder .............. G06F 21/73 |
| 2019/0044702 A1 | 2/2019 | Natu et al. |
| 2019/0305938 A1 * | 10/2019 | Sandberg-Maitland .................. H04L 9/321 |
| 2019/0384918 A1 | 12/2019 | Ndu et al. |
| 2020/0074083 A1 | 3/2020 | Hou et al. |

OTHER PUBLICATIONS

Ryan Kenny et al., "Secure Computing Environment for SoCs and FPGAS," White Paper, Oct. 2014, pp. 1-10, WP-01235-1.0, Altera Corporation.

* cited by examiner

VALIDATING MACHINE-READABLE INSTRUCTIONS USING AN ITERATIVE VALIDATION PROCESS

BACKGROUND

A computing device can include a main processor to execute machine-readable instructions to perform various operations. A "main processor" can refer to a processor in the computing device that executes programs such as system firmware, an operating system, and an application program. A "program" refers to machine-readable instructions. In addition to the main processor, the computing device also includes other electronic components, such as a storage device, a memory device, a network interface controller, a graphics controller, and so forth.

BRIEF DESCRIPTION OF THE DRAWINGS

Some implementations of the present disclosure are described with respect to the following figures.

Figure 1:
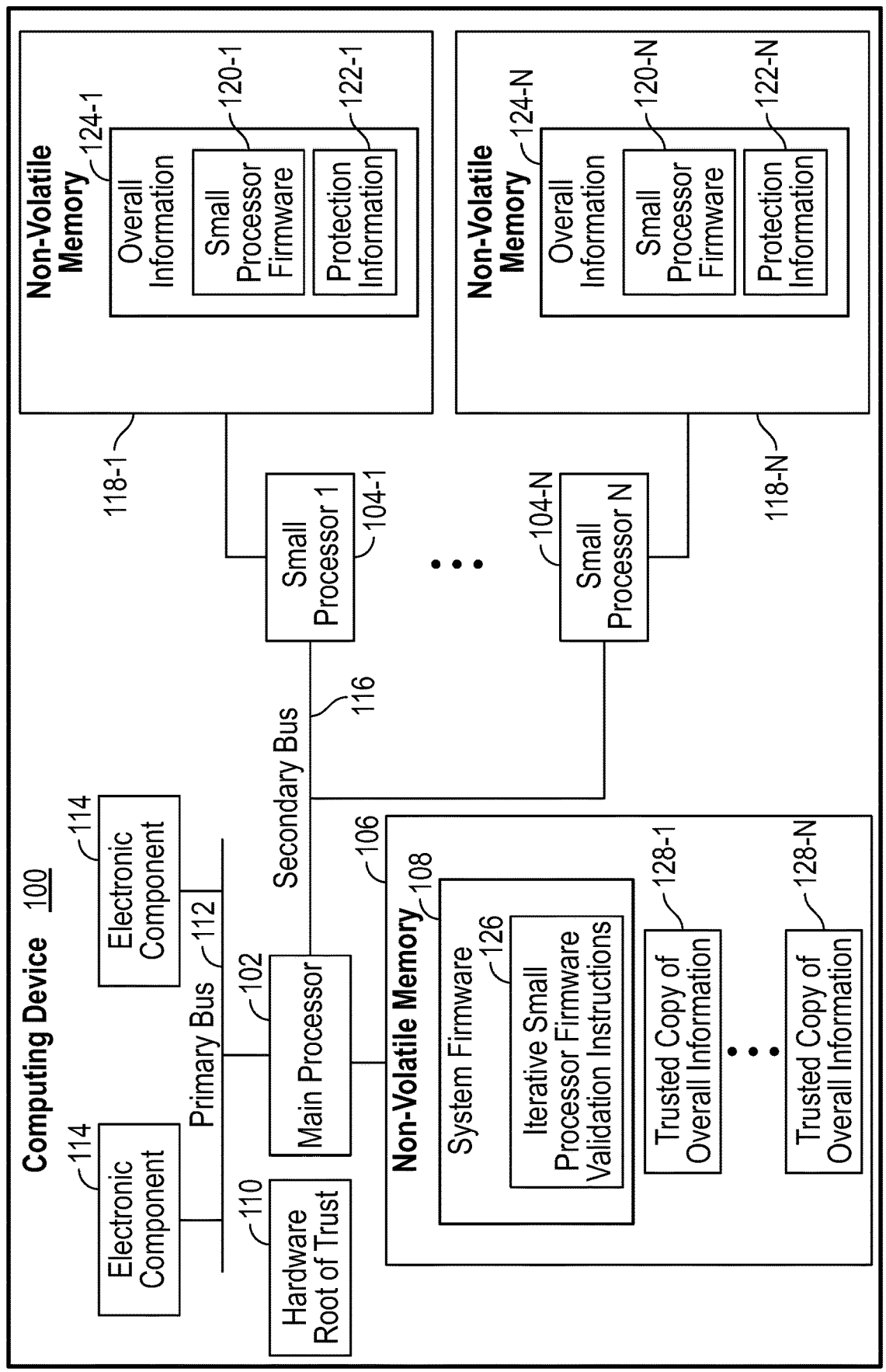
FIG. 1 is a block diagram of a computing device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, in addition to a main processor, a computing device can also include an additional processor (or multiple additional processors). A processor can include a microprocessor, a core of a multi-core microprocessor, a microcontroller, a programmable integrated circuit, a programmable gate array, or another hardware processing circuit.

In some examples, an additional processor can have a smaller processing capacity than the main processor. The additional processor can be provided to perform specific operations in the computing device so that the main processor would not have to be burdened from performing such specific operations.

To provide security, the computing device can include a root of trust, which can refer to a secure entity in the computing device that can be trusted to be free from compromise by an unauthorized entity, such as a hacker, malware, and so forth. A hardware root of trust refers to a security arrangement (implemented using hardware and machine-readable instructions) that employs a chain of cryptographic operations that is triggered within the hardware and seamlessly transitions to firmware. The chain of cryptographic operations allows for verification of information and logic on behalf of other electronic components in the computing device. For example, prior to executing machine-readable instructions (e.g., system firmware, an operating system, an application program, etc.) on the main processor of the computing device, the hardware root of trust can be employed to validate the machine-readable instructions, to confirm that the machine-readable instructions have not been compromised either unintentionally or intentionally.

As an example, a hardware root of trust can compute a value (e.g., a checksum, a cryptographic hash, etc.) of the machine-readable instructions, and compare the computed value to an expected value. The expected value can be stored in a secure manner to protect the expected value from unauthorized access. If the computed value matches the expected value, then that provides confirmation that the machine-readable instructions have not been compromised.

An intentional compromise of the machine-readable instructions can be performed by an unauthorized entity, such as by a hacker, malware, and so forth. For example, the unauthorized entity can modify the machine-readable instructions, replace the machine-readable instructions with different machine-readable instructions that can perform malicious acts, and so forth.

An unintentional modification of the machine-readable instructions can be caused by either a hardware error or a program error.

If the hardware root of trust provides an indication that the machine-readable instructions have been compromised, the computing device can prevent execution of the machine-readable instructions to prevent malicious operations or other operations that can result in errors in the computing device.

Although the hardware root trust can be employed for information (e.g., machine-readable instructions) associated with the main processor, the hardware root of trust may not be available to protect information for any additional processors of a computing device.

An example of an additional processor can include a complex programmable logic device (CPLD) (which can be implemented as a field programmable gate array (FPGA), for example), a Programmable Interface Controller (PIC), a small microprocessor (e.g., in 8-bit microprocessor, a 16-bit microprocessor, etc.), or any other hardware processing circuit that has less processing capacity than the main processor.

If the hardware root of trust is not available to an additional processor, then the hardware root of trust would not be usable to validate machine-readable instructions (e.g., firmware) executable by the additional processor. As a result, machine-readable instructions executed by the additional processor may be compromised and can cause errors, corruption, and insecure operations in the computing device.

In accordance with some implementations of the present disclosure, techniques or mechanisms are provided to validate machine-readable instructions executable by an additional processor or multiple additional processors). "Validating" machine-readable instructions refers to checking the machine-readable instructions to ensure that the machine-readable instructions have not been modified in any way or replaced with a different version, whether intentionally or unintentionally.

FIG. 1 shows a computing device 100 according to some examples. Examples of a computing device can include a desktop computer, a notebook computer, a tablet computer, a server computer, a communication node (e.g., a router, a switch, etc.), a storage system, and so forth.

The computing device 100 includes a main processor 102 and small processors 104-1 to 104-N (where N≥1). Although multiple small processors are shown in FIG. 1, in other examples, the computing device 100 can include just one small processor in addition to the main processor 102.

A "small processor" has a processing capacity that is less than the processing capacity of the main processor 102. A processing capacity of a processor refers to a quantity of instructions that can be executed within a time window by the processor. A smaller processing capacity means that the processor can execute a smaller quantity of instructions than another processor that has a larger processing capacity.

The main processor 102 is coupled to a non-volatile memory 106 that can be implemented using a non-volatile memory device or multiple non-volatile memory devices. A non-volatile memory device refers to a memory device that maintains information stored in the non-volatile memory device even when power is removed from the non-volatile memory device. Examples of non-volatile memory devices include any or some combination of the following: a flash memory device, an electrically erasable programmable read-only memory (EEPROM), and so forth.

The non-volatile memory 106 stores system firmware 108 (including machine-readable instructions) that can be executed by the main processor 102. For example, the system firmware 108 can include boot code to perform startup tasks of the computing device 100 when powering up or in response to a reset. The boot code can initialize hardware electronic components in the computing device 100, and can load an operating system (OS) for execution in the computing device 100.

Prior to execution of the system firmware 108 by the main processor 102, a hardware root of trust 110 can be used to validate the system firmware 108 to confirm that the system firmware 108 (or a portion of the system firmware 108) has not been compromised, either intentionally or unintentionally. In other examples, instead of using the hardware root of trust 110 to validate the system firmware 108, a different mechanism can be used for validating the system firmware 108.

Although the hardware root of trust 110 can be used to validate the system firmware 108, it is noted that the hardware root of trust 110 may not be available to validate machine-readable instructions executable on any of the small processors 104-1 to 104-N.

In some examples, the hardware root of trust 110 can be included in a baseboard management controller (BMC). In other examples, the hardware root of trust 110 can be implemented using a different mechanism, such as a Trusted Platform Module (TPM), and so forth.

A BMC is an example of a management controller that is separate from the main processor 102 of the computing device 100. As used herein, a "BMC" is a specialized service controller that monitors the physical state of a computing device (such as 100) using sensors and communicates with a remote management system (that is remote from the computing device 100, for example) through an independent "out-of-band" connection.

The BMC has management capabilities to manage components of the computing device 100. Examples of management capabilities of the BMC can include any or some combination of the following: power control to perform power management of the computing device 100 (such as to transition the computing device 100 between different power consumption states in response to detected events), thermal monitoring and control of the computing device 100 (such as to monitor temperatures of the computing device 100 and to control thermal management devices of the computing device 100), fan control of fans in the computing device 100, system health monitoring based on monitoring measurement data of various sensors of the computing device 100, remote access of the computing device 100 (to access the computing device 100 over a network, for example), remote reboot of the computing device 100 (to trigger the computing device 100 to reboot using a remote command), system setup and deployment of the computing device 100, system security to implement security procedures in the computing device 100, and so forth.

In some examples, the BMC can provide so-called "lights-out" functionality for computing devices. The lights out functionality may allow a user, such as a systems administrator, to perform management operations on the computing device 100 even if the OS is not installed or not functional on the computing device 100.

Moreover, in some examples, the BMC can run on auxiliary power provided by an auxiliary power supply (e.g., a battery); as a result, the computing device 100 does not have to be powered on to allow the BMC to perform the BMC's operations. The auxiliary power supply is separate from a main power supply (not shown) that supplies powers to other components (e.g., the main processor 102, etc.) of the computing device 100.

The main processor 102 is connected over a primary bus 112 to electronic components 114. Although multiple electronic components are shown connected to the primary bus 112, in other examples, just one electronic component 114 may be connected to the primary bus 112. Examples of electronic components 114 can include any or some combination of the following: a network interface controller, a storage device controller, a graphics controller, a bridge controller, and so forth.

Although the non-volatile memory 106 is not shown as being connected to the primary bus 112, it is noted that in other examples, the non-volatile memory 106 can be connected to the primary bus 112 for access by the main processor 102.

The main processor 102 is also connected over a secondary bus 116 to the small processors 104-1 to 104-N. In some examples, the secondary bus includes an Inter-Integrated Circuit ($I^2C$) bus. In other examples, other types of secondary buses can be used to connect the main processor 102 to the small processors 104-1 to 104-N.

In the example of FIG. 1, each small processor 104-$i$ ($i$=1 to N) is connected to a respective non-volatile memory 118-$i$. Thus, the small processor 104-1 is connected to a non-volatile memory 118-1, and the small processor 104-N is connected to non-volatile memory 118-N. Note that each non-volatile memory 118-$i$ may be part of or separate from the small processor 104-$i$.

In other examples, a non-volatile memory can be shared by the multiple small processors 104-1 to 104-N. In yet further examples, information for the small processors 104-1 to 104-N can be stored in the non-volatile memory 106 that also stores the system firmware that is executable on the main processor 102.

In the ensuing discussion, it is assumed that each small processor 104-$i$ is connected to a respective separate non-volatile memory 118-*i*. Similar techniques can be applied in other examples where a non-volatile memory is shared by multiple small processors.

The non-volatile memory 118-1 stores small processor firmware 120-1 (or other machine-readable instructions) that is executable on the small processor 104-1. In accordance with some implementations of the present disclosure, the small processor firmware 120-1 is stored with protection information 122-1 (e.g., random values). Collectively, the small processor firmware 120-1 and the protection information 122-1 are concatenated to form overall information 124-1 stored in the non-volatile memory 118-1. The overall information 124-1 is used for validating the small processor firmware 120-1.

The protection information 122-1 is added to fill up (entirely or partially) the unused storage space in the non-volatile memory 118-1 to prevent use of the unused space for an unauthorized purpose. Further details of how the protection information 122-1 can be used to thwart attacks against the small processor firmware 120-1 is discussed further below.

Similarly, the non-volatile memory 118-N stores small processor firmware 120-N that is executable on the small processor 104-N. In addition, the non-volatile memory 118-N stores protection information 122-N that is concatenated with the small processor firmware 120-N to form overall information 124-N stored in the non-volatile memory 118-N.

In accordance with some implementations of the present disclosure, the system firmware 108 (and more specifically, iterative small processor firmware validation instructions 126 in the system firmware 108) is used to validate each small processor firmware 120-*i* prior to execution of the small processor firmware 120-*i* on the respective small processor 104-*i*. The iterative small processor firmware validation instructions 126 are executed on the main processor 102 after validation of the system firmware 108 (or a portion of the system firmware 108) by the hardware root of trust 110.

The iterative small processor firmware validation instructions 126 can perform an iterative validation process that includes multiple iterations performed at different times. Each iteration performs a separate independent validation of the respective small processor firmware 120-*i*. For example, a first iteration of the iterative validation process may determine that the small processor firmware 120-*i* is valid. However, a second iteration of the multiple iterations may determine that the small processor firmware 120-*i* is not valid (i.e., the small processor firmware 120-*i* has been compromised in some way).

The independent validations performed in the different iterations select different portions of the overall information 124-*i* to perform the validation of the small processor firmware 120-*i*. In some examples, the iterative small processor firmware validation instructions 126 randomly select different portions of the small processor firmware 120-*l* when performing the validations in the respective different iterations of the iterative validation process.

The iterative small processor firmware validation instructions 126 can employ respective trusted copies of overall information 128-1 to 128-N to validate the respective small processor firmware 120-1 to 120-N (discussed further below). The trusted copy of overall information 128-1 is a copy of the overall information 124-1 (including the small processor firmware 120-1 and the protection information 122-1) at a state prior to any modification that may have occurred intentionally or unintentionally. Similarly, the trusted copy of overall information 128-N is a copy of the overall information 124-N (including the small processor firmware 120-N and the protection information 122-N) at a state prior to any modification that may have occurred intentionally or unintentionally.

Figure 2:
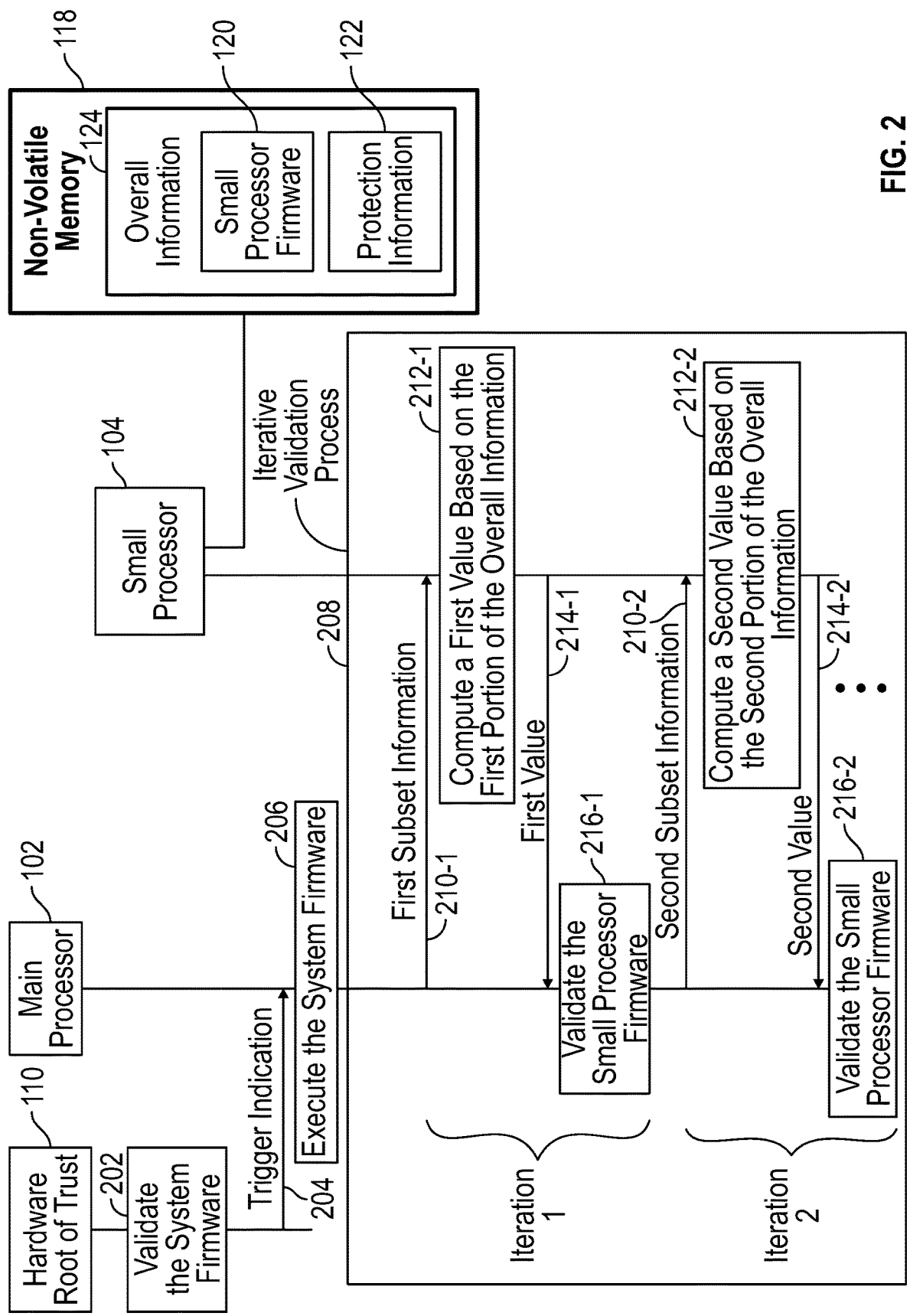
FIG. 2 is a message flow diagram of a process according to some examples.

FIG. 2 is a message flow diagram of the process according to some examples. The entities involved in the message flow diagram include the hardware root of trust 110, the main processor 102, and a small processor 104 (which can be any of the small processors 104-1 to 104-N).

Initially, such as during system power up or reset, the hardware root of trust 110 validates (at 202) the system firmware 108 (or a portion of the system firmware 108). Assuming that the hardware root of trust 110 successfully validated the system firmware 108 (or a portion of the system firmware 108), the hardware root of trust 110 sends (at 204) a trigger indication to the main processor 102, which indicates to the main processor 102 that the main processor 102 is allowed to execute the system firmware 108. The trigger indication can be in the form of a signal, a command, a message, an information element, or any other type of indicator.

In response to the trigger indication, the main processor 102 executes (at 206) the system firmware 108, including the iterative small processor firmware validation instructions 126. The iterative small processor firmware validation instructions 126 can initiates an iterative validation process (208) with the small processor 104.

The iterative validation process 208 includes multiple iterations that independently validate the small processor firmware 120 for the small processor 104, where the validations in the respective multiple iterations are based on respective different random portions of the overall information 124 (one of 124-1 to 124-N in FIG. 1). The overall information 124 includes the small processor firmware 120 (one of 120-1 to 120-N) and protection information 122 (one of 122-1 to 122-N). The overall information 124 is stored in the non-volatile memory 118 (one of 118-1 to 118-N) for the small processor 104.

In iteration 1 of the iterative validation process, the main processor 102 (under control of the iterative small processor firmware validation instructions 126) sends (at 210-1) a first subset information identifying a first (randomly selected) portion of the overall information 124 stored in the non-volatile memory 118 for the small processor 104. The non-volatile memory 118 can be one of the non-volatile memories 118-1 to 118-N. The overall information 124 further includes protection information 122 (one of 122-1 to 122-N in FIG. 1).

In some examples, the first subset indicating information can include a first address range identifying a range of addresses at which the first portion of the overall information 124 is located. In some examples, the iterative small processor firmware validation instructions 126 can use a random number generator (which can include a software random number generator or a hardware random number generator) to generate a random number (or multiple random numbers) that is (are) used by the iterative small processor firmware validation instructions 126 to determine the first address range. More generally, the random number(s) can be used to select a random address range to identify the first portion of the overall information 124.

In response to the first subset information, the small processor 104 retrieves the first portion of the overall information 124 (e.g., at the memory addresses of the first address range) and computes (at 212-1) a first value based on the first portion of the overall information 124. For example, a cryptographic hash function can be applied on the first portion of the overall information 124 to produce a hash value. An example of a cryptographic hash function is a Secure Hash Algorithm (SHA) function. In other examples, other types of cryptographic hash functions can be employed. In further examples, the value computed can be a checksum based on the first portion of the overall information 124.

The small processor 104 sends (at 214-1) the computed first value to the main processor 102. The main processor 102 (under control of the iterative small processor firmware validation instructions 126) validates (at 216-1) the small processor firmware 120 by comparing the first value returned by the small processor 104 to an expected value.

In some examples, the expected value can be computed based on a selected portion of a trusted copy of overall information 128 (e.g., one of 128-1 to 128-N in FIG. 1). For example, a hash value, a checksum, and so forth, may be computed based on the selected portion of the trusted copy of overall information 128. The selected portion of the trusted copy of overall information 128 can be at the same first address range used to cause selection of the first portion of the overall information 124.

The iterative small processor firmware validation instructions 126 can determine that the small processor firmware 120 is valid if the first value returned from the small processor 104 matches the expected value computed by the iterative small processor firmware validation instructions 126 based on the selected portion of the trusted copy of overall information 128.

In iteration 2 of the iterative validation process, the main processor 102 (under control of the iterative small processor firmware validation instructions 126) sends (at 210-2) a second subset information identifying a second (randomly selected) portion of the overall information 124 stored in the non-volatile memory 118 for the small processor 104.

In some examples, the second subset indicating information can include a second address range identifying a random range of addresses at which the second portion of the overall information 124 is located.

In response to the second subset information, the small processor 104 retrieves the second portion of the overall information 124 (e.g., at the memory addresses of the second address range) and computes (at 212-2) a second value based on the second portion of the overall information 124.

The small processor 104 sends (at 214-2) the computed second value to the main processor 102. The main processor 102 (under control of the iterative small processor firmware validation instructions 126) validates (at 216-2) the small processor firmware 120 by comparing the second value returned by the small processor 104 to an expected value, which can be computed based on a second selected portion of the trusted copy of overall information 128.

Additional iterations of the iterative validation process can perform similarly with respect to different randomly selected portions of the overall information 124 and different randomly selected portions of the trusted copy of overall information 128

As noted above, the protection information 122-i can be used to fill up (entirely or partially) unused storage space in the respective non-volatile memory 118-i that also stores the small processor firmware 120-i. Filling up the unused storage space prevents an unauthorized entity (e.g., a hacker, malware, etc.) from storing information in the unused storage space that may help the unauthorized entity in returning a value that matches an expected value computed by the iterative small processor firmware validation instructions 126.

In an example, if sufficient unused storage space is available in the non-volatile memory 118-i, the unauthorized entity can store a valid copy of the small processor firmware 120-i in the unused storage space. The valid copy of e small processor firmware 120-i in the unused storage space can be used to compute a value that would be more likely to match the expected value computed by the iterative small processor firmware validation instructions 126, even though the unauthorized entity may have modified the small processor firmware 120-i.

In other examples, the unused storage space can be used by the unauthorized entity to store a large number of hash values, checksums, etc., that may be retrieved and returned by the small processor 104-i during validation to increase the likelihood of matching the expected value computed by the iterative small processor firmware validation instructions 126.

As noted above, the protection information 122-i can include a collection of random values, which may be generated by a random number generator used by the iterative small processor firmware validation instructions 126. By including random values in the protection information 122-i, unauthorized code executing on the small processor 104-i would be less likely to be able to generate valid values for validating the small processor firmware 120-i.

Figure 3:
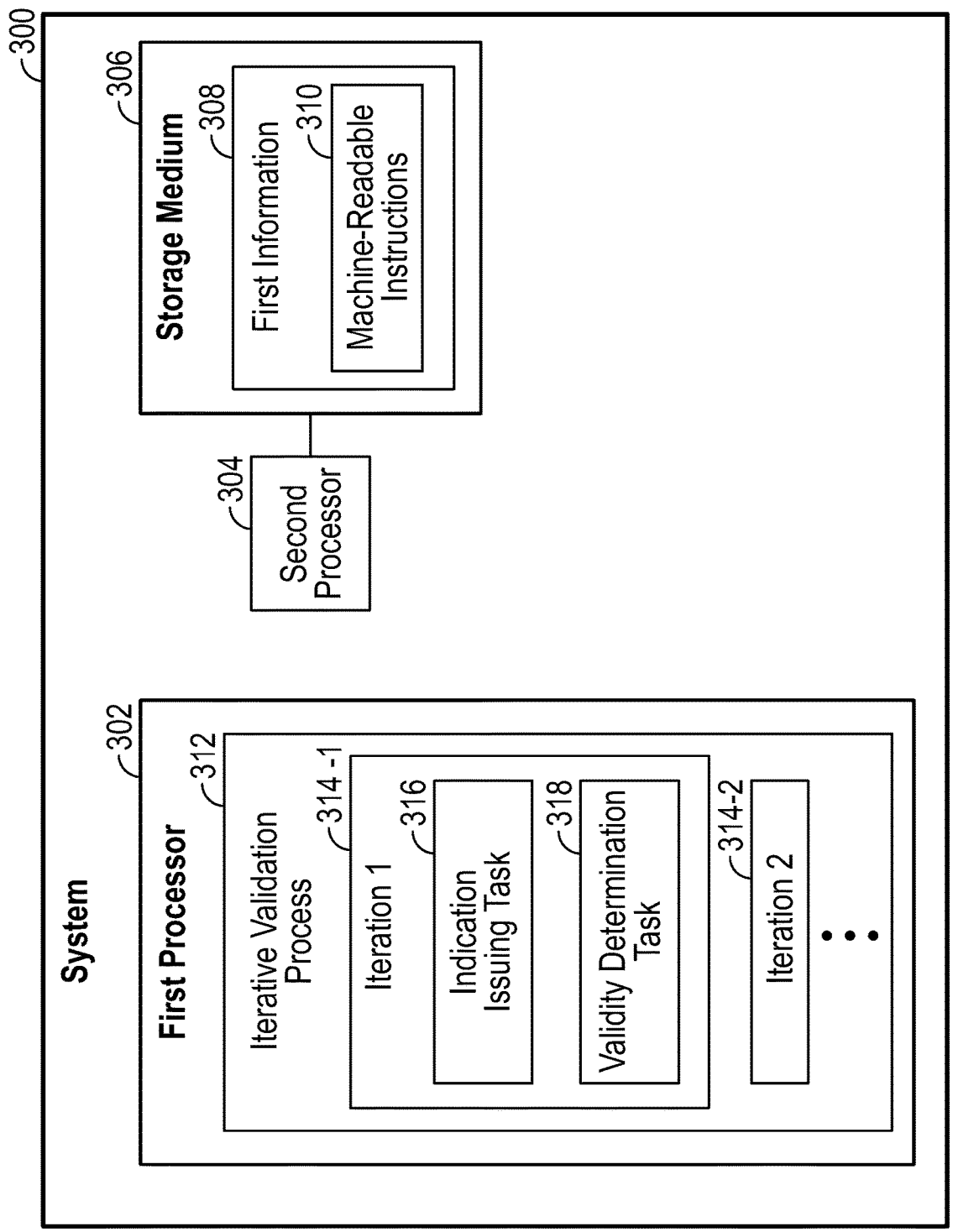
FIG. 3 is a block diagram of the system according to some examples.

FIG. 3 is a block diagram of a system 300 according to some examples. The system 300 can include a computing device, such as 100 shown in FIG. 1. The system 300 includes a first processor 302 (e.g., the main processor 102 of FIG. 1), a second processor 304 (e.g., a small processor 104-i of FIG. 1), and a storage medium 306 to store first information 308 including machine-readable instructions 310 (e.g., the small processor firmware 120-i) executable by the second processor 304. The first information 308 can be the overall information 124-i of FIG. 1.

The first processor 302 is to validate the machine-readable instructions 310 using an iterative validation process 312 involving a plurality of iterations 314-1, 314-2, etc., at corresponding different times. Each respective iteration 314-j (j=1, 2, . . . ) of the plurality of iterations includes an indication issuing task 316 that issues a respective indication to the second processor 304 to compute a value based on a respective subset of the first information 308. The respective indication includes respective subset information (e.g., a first random address range) identifying the respective subset, where the respective subset information differs from different subset information (e.g., a second random address range) included in another indication issued in another iteration of the plurality of iterations, where the different subset information identifies a different subset of the first information 308.

The tasks of the respective iteration 314-j further include a validity determination task 318 that determines a validity of the machine-readable instructions 310 based on the value returned to the first processor 302 by the second processor 304.

In some examples, in each iteration, the first processor 302 selects a random portion of the first information 308 for validating.

In some examples, the first processor 302 is connected to the second processor 304 over a link (e.g., secondary bus 116 in FIG. 1) that is separate from a bus (e.g., 112 in FIG. 1) that connects the first processor 302 to another electronic component (e.g., 114 in FIG. 1).

In some examples, to validate the machine-readable instructions 310 in each iteration, the first processor 302 computes a corresponding value of a corresponding subset of a trusted copy of the first information 308, compares the corresponding value to the value returned by the second processor 304, and indicates that the machine-readable instructions 310 are valid (or invalid) based on the comparison.

In some examples, after determining that the machine-readable instructions 310 are valid in a first iteration of the plurality of iterations 314-1, 314-2, etc., the processor 102 performs a second iteration of the plurality of iterations to check whether the machine-readable instructions 310 are valid.

In some examples, the plurality of iterations 314-1, 314-2, etc., are performed on a periodic basis, i.e., each iteration 314-j is initiated after passage of a specified time interval.

In some examples, in addition to the machine-readable instructions 310, the first information 308 can additionally include protection information such as random values.

Figure 4:
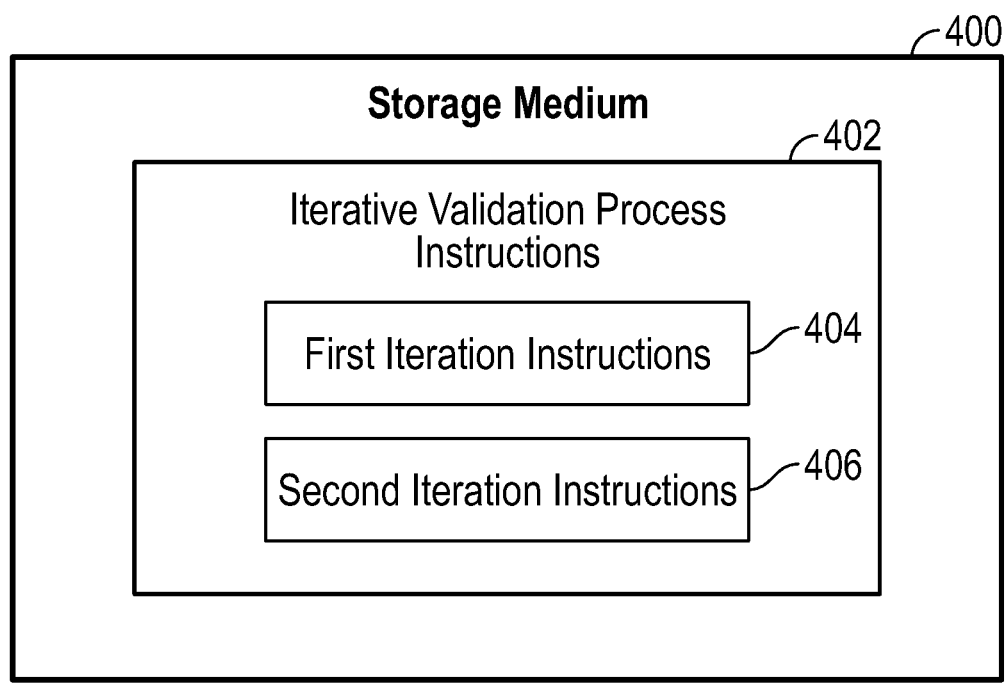
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a first processor (e.g., 102 in FIG. 1) to perform various tasks.

The machine-readable instructions include iterative validation process instructions 402 to perform an iterative validation process comprising a plurality of iterations performed at different times for validating a program executable on a second processor different from the first processor. The iterative validation process includes first iteration instructions 404 to, in a first iteration, issue a first challenge to the second processor to compute a first value based on a first subset of the program, where the first challenge includes first subset information identifying a first subset of stored information including the program. The first iteration instructions 404 are to further, in the first iteration, receive, from the second processor, the first value in response to the first challenge, and determine whether the program is valid based on the first value received from the second processor.

The iterative validation process includes second iteration instructions 406 to, in a second iteration, issue a second challenge to the second processor to compute a second value based on a second subset of the program, where the second challenge includes second subset information identifying a second subset of the stored information, receive, from the second processor, the second value in response to the first challenge, and determine whether the program is valid based on the second value received from the second processor.

The iterative validation process can include further iteration instructions to perform validity checking in other iterations.

In some examples, the stored information is stored in a memory (e.g., 118-i in FIG. 1). The stored information further includes random values that entirely or partially fill up an unused storage space of the memory.

Figure 5:
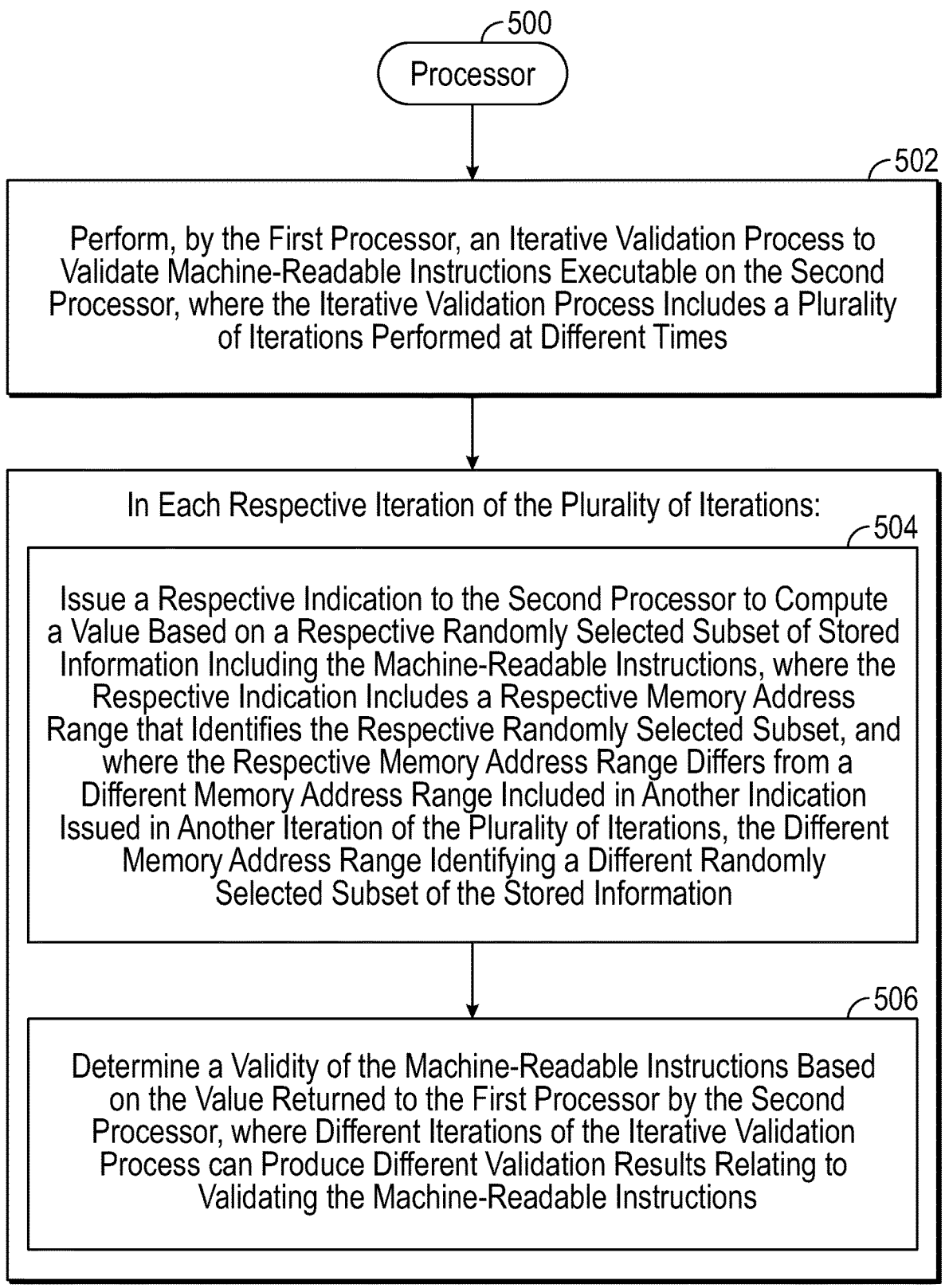
FIG. 5 is a flow diagram of a process according to some examples.

FIG. 5 is a flow diagram of a process 500 according to some examples. The process 500 includes performing (at 502), by the first processor, an iterative validation process to validate machine-readable instructions executable on the second processor, where the iterative validation process includes a plurality of iterations performed at different times.

In each respective iteration of the plurality of iterations, the process 500 includes issuing (at 504) a respective indication to the second processor to compute a value based on a respective randomly selected subset of the machine-readable instructions, where the respective indication includes a respective memory address range that identifies the respective randomly selected subset, and where the respective memory address range differs from different memory address range included in another indication issued in another iteration of the plurality of iterations, the different memory address range identifying a different randomly selected subset of the machine-readable instructions.

In each respective iteration of the plurality of iterations, the process 500 further includes determining (at 506) a validity of the machine-readable instructions based on the value returned to the first processor by the second processor, where different iterations of the iterative validation process can produce different validation results relating to validating the machine-readable instructions. For example, a first iteration may indicate that the machine-readable instructions are valid, and a second iteration may indicate that the machine-readable instructions are not valid. If any iteration of the plurality of iterations indicate that the machine-readable instructions are not valid, then the machine-readable instructions would be marked as invalid.

A storage medium (e.g., 400 in FIG. 4 or any other storage medium described herein) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a first processor;
a second processor;
a storage medium to store first information comprising machine-readable instructions executable by the second processor,
wherein the first processor is to validate the machine-readable instructions using an iterative validation process comprising a plurality of iterations at different times, each respective iteration of the plurality of iterations comprising:
issuing, from the first processor, a respective indication to the second processor to compute a value based on a respective subset of the first information, wherein the respective indication issued from the first processor to the second processor includes respective subset information identifying the respective subset, wherein the respective subset information differs from different subset information included in another indication issued from the first processor to the second processor in another iteration of the plurality of iterations, the different subset information identifies a different subset of the first information, and determining a validity of the machine-readable instructions based on the value returned to the first processor by the second processor.

2. The system of claim 1, wherein the first processor is to, in the respective iteration:

select the respective subset as a random portion of the first information, the random portion selected in the respective iteration being different from a further random portion of the first information, the further random portion being part of the different subset.

3. The system of claim 2, wherein the respective subset information comprises a respective random address range identifying the respective random portion, and the different subset information comprises a different random address range identifying the further random portion, wherein the first processor is to send the respective random address range to the second processor in the respective iteration, and wherein the first processor is to send the different random address range to the second processor in the another iteration.

4. The system of claim 1, wherein the first processor is connected to the second processor over a link that is separate from a bus that connects the first processor to another electronic component.

5. The system of claim 1, wherein the value is a cryptographic hash value computed based on the respective subset of the first information.

6. The system of claim 1, wherein the first processor is to, in the respective iteration:

compute a corresponding value of a corresponding subset of a trusted copy of the first information, compare the corresponding value to the value returned by the second processor, and indicate that the machine-readable instructions stored in the storage medium are valid based on the comparison.

7. The system of claim 1, wherein the first processor is to:

after determining that the machine-readable instructions are valid in a first iteration of the plurality of iterations, perform a second iteration of the plurality of iterations to check whether the machine-readable instructions are valid.

8. The system of claim 7, wherein the first processor is to, in the second iteration:

indicate that the machine-readable instructions are invalid responsive to a value returned by the second processor in the second iteration not matching an expected value.

9. The system of claim 1, wherein the plurality of iterations is performed on a periodic basis.

10. The system of claim 1, wherein the first information comprises the machine-readable instructions and random values.

11. The system of claim 1, wherein the first processor is to execute further machine-readable instructions that have been validated by a hardware root of trust, and wherein the further machine-readable instructions are executable on the first processor to perform the iterative validation process.

12. The system of claim 1, wherein the machine-readable instructions comprise firmware executable by the second processor.

13. The system of claim 1, further comprising:

a third processor; and a further storage medium to store second information comprising further machine-readable instructions executable by the third processor, wherein the first processor is to validate the further machine-readable instructions using a further iterative validation process involving a plurality of iterations at different times, each respective iteration of the plurality of iterations of the further iterative validation process comprising:

issuing, from the first processor, a respective further indication to the third processor to compute a further value based on a respective subset of the second information, wherein the respective indication includes respective subset information identifying the respective subset of the second information, and determining a validity of the further machine-readable instructions based on the further value returned to the first processor by the third processor.

14. A non-transitory machine-readable storage medium comprising instructions that upon execution cause a first processor to:

perform an iterative validation process comprising a plurality of iterations performed at different times for validating a program executable on a second processor different from the first processor, wherein the iterative validation process comprises:

in a first iteration:

issue a first challenge to the second processor to compute a first value based on a first subset of the program, wherein the first challenge includes first subset information identifying a first subset of stored information including the program, receive, from the second processor, the first value in response to the first challenge, and determine whether the program is valid based on the first value received from the second processor; and in a second iteration:

issue a second challenge to the second processor to compute a second value based on a second subset of the program, wherein the second challenge includes second subset information identifying a second subset of the stored information, receive, from the second processor, the second value in response to the first challenge, and determine whether the program is valid based on the second value received from the second processor.

15. The non-transitory machine-readable storage medium of claim 14, wherein the first and second values comprise hash values or checksums.

16. The non-transitory machine-readable storage medium of claim 14, wherein the instructions upon execution cause the first processor to:

issue challenges as part of the iterative validation process on a periodic basis to the second processor, the challenges comprising the first challenge and the second challenge.

17. The non-transitory machine-readable storage medium of claim 14, wherein stored information is stored in a memory, the stored information further comprising random values that entirely or partially fill up an unused storage space of the memory.

18. The non-transitory machine-readable storage medium of claim 14, wherein the instructions executable by the first processor have been validated by a hardware root of trust.

19. A method of a system comprising a first processor and a second processor, comprising;
  performing, by the first processor, an iterative validation process to validate machine-readable instructions executable on the second processor, the iterative validation process comprising a plurality of iterations performed at different times, each respective iteration of the plurality of iterations comprising:
    issuing, from the first processor, a respective indication to the second processor to compute a value based on a respective randomly selected subset of stored information comprising the machine-readable instructions, wherein the respective indication includes a respective memory address range that identifies the respective randomly selected subset as selected by the first processor, and wherein the respective memory address range differs from a different memory address range included in another indication issued from the first processor to the second processor in another iteration of the plurality of iterations, the different memory address range identifying a different randomly selected subset of the stored information as selected by the first processor, and
    determining a validity of the machine-readable instructions based on the value returned to the first processor by the second processor,
  wherein different iterations of the iterative validation process can produce different validation results relating to validating the machine-readable instructions.

20. The method of claim 19, further comprising, in the respective iteration:
  computing a corresponding value of a corresponding subset of a trusted copy of the stored information,
  comparing the corresponding value to the value returned by the second processor, and
  indicating that the machine-readable instructions stored are valid based on the comparison.

* * * * *